United States Patent Office 3,316,778
Patented May 2, 1967

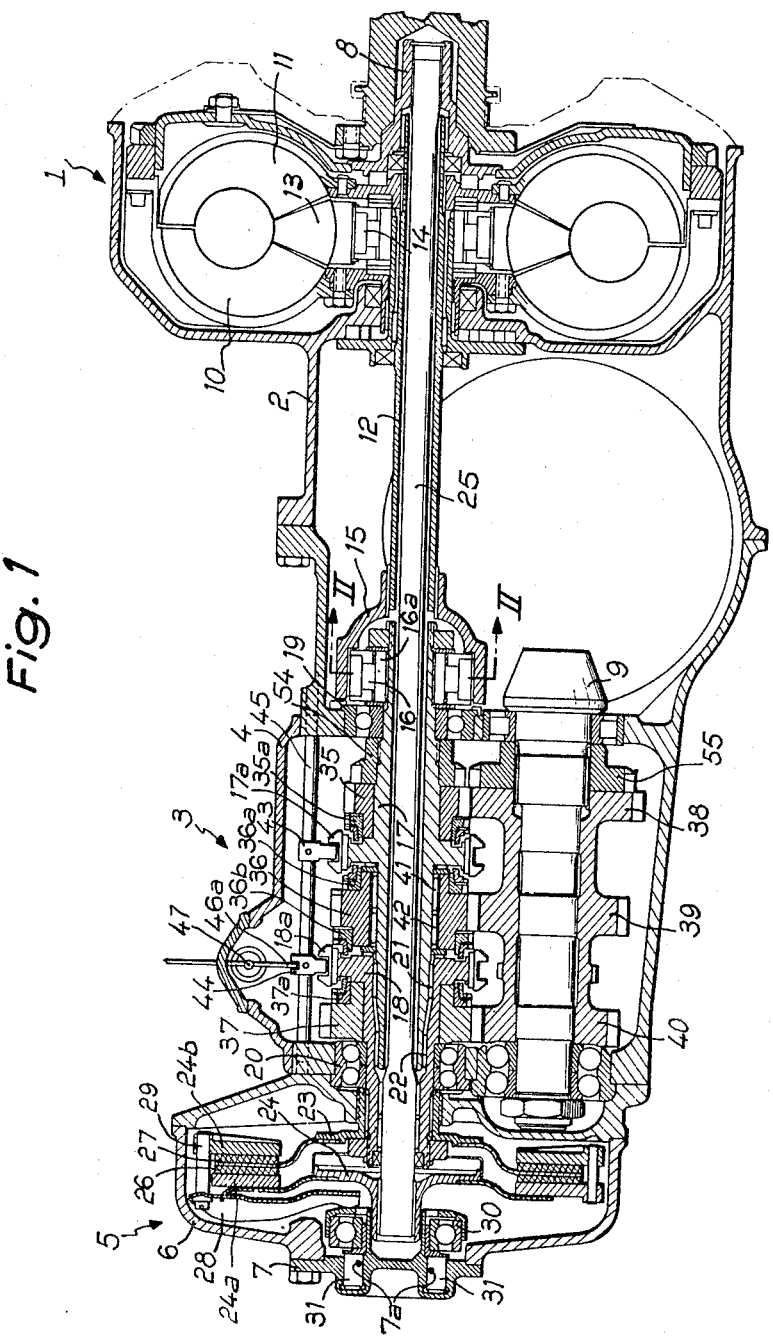

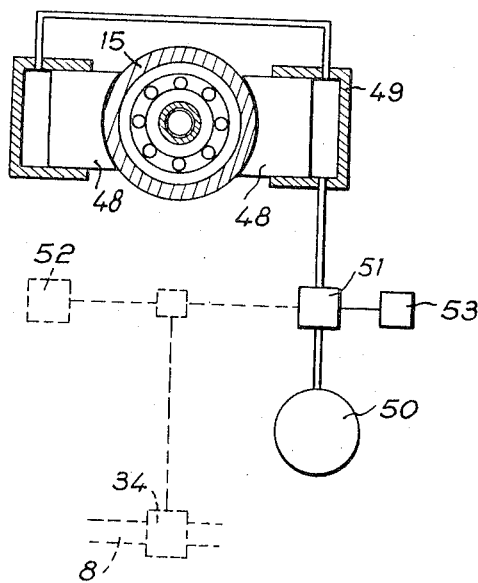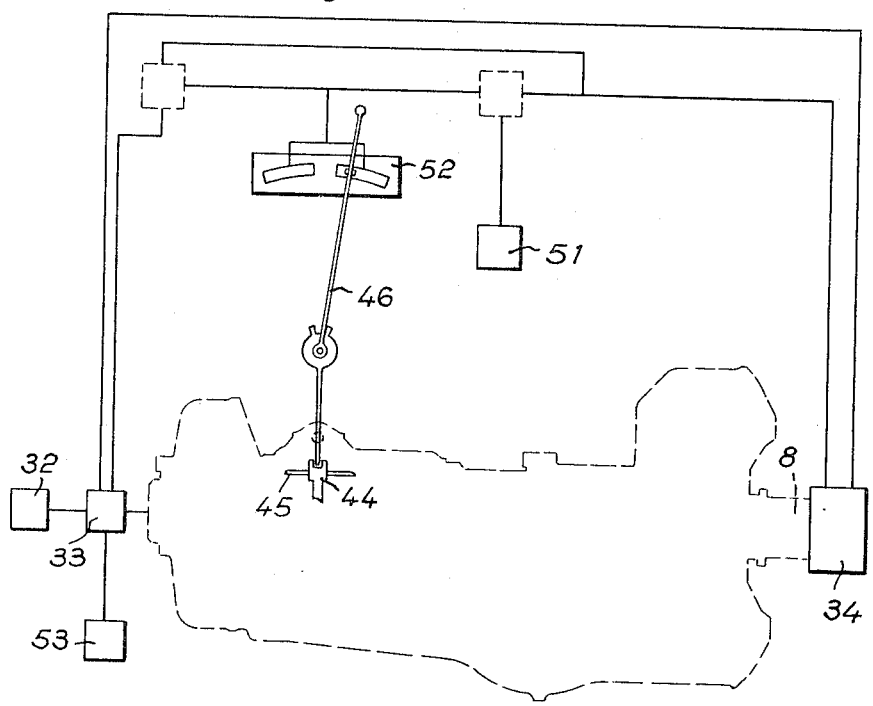

3,316,778
GEAR BOX
Antoine Brueder, Paris, France, assignor to Société Anonyme André Citroën, Paris, France, a French society of France
Filed July 28, 1964, Ser. No. 385,728
Claims priority, application France, July 31, 1963, 943,248
10 Claims. (Cl. 74—732)

Clutches and torque converters, particularly of the type that are hydraulically operated, are frequently used in change-speed devices or gear boxes, especially those associated with internal combustion engines. It is however generally necessary to provide an automatic mechanical device connected to the clutch in order to effect variation of the transmission ratio between the driving and the driven shafts. These mechanical devices result in complicated assemblies including a considerable number of brakes and gears and which perform numerous automatic operations for effecting the desired variation of transmission ratio.

In these known devices there thus exist a great number of fragile members which when damaged are sometimes difficult to repair and which in certain cases may even lead to accidents.

The present invention has for an object to obviate the disadvantages of known automatic gear boxes and to provide an automatic device for changing the reduction ratio of the transmission of a driving torque from a driving shaft to a driven shaft, and which is particularly applicable to the gear boxes of vehicles.

According to the invention the device comprises two shafts having sliding collars mounted idly with respect to one another, each sliding collar being capable of taking up at least two positions, in one of which it is engaged by dog clutch with a pinion meshing with a corresponding pinion coupled with the driven shaft. One of the shafts with a sliding collar engages by means of a free wheel with the output shaft of a hydraulic torque converter driven by the driving shaft, while the second such shaft is coupled with the output plate of a clutch, the input plate of which is keyed to the driving shaft. Means are further provided to control the clutch in accordance with the rotational speed of the driving shaft and the torque transmitted thereby.

French Patent 1,113,984 discloses devices generating signals of varying characteristics as a function of operational parameters of a driving shaft and in particular as a function of its speed of rotation and of the torque transmitted. Devices of this type may be used in order to control the clutch mentioned above in accordance with the operational parameters of the driving shaft, i.e. of the internal combustion engine at the output of which may be located a transmission or gear box according to the invention.

According to the arrangement of the invention the transmission of the driving torque from the driving shaft to the driven shaft comprises three stages corresponding to three different automatically selected reduction gears. The first stage represents the combination of the maximum reduction ratio given by the hydraulic converter and the reduction ratio of the first shaft with sliding collar driven by said converter. The second stage represents the single reduction ratio of the first shaft with sliding collar when the converter is acting as a coupling. The third stage represents the reduction ratio given by the second such shaft with sliding collar as a result of the engagement of the clutch which automatically cuts out the converter.

Although the device which has thus been briefly described allows satisfactory results to be obtained, it nonetheless seems useful, particularly in the case of gear boxes for motor vehicles, to provide for each shaft with sliding collar, besides the position corresponding to neutral or dead center, two dog clutch positions corresponding to two different speed ranges.

The invention will moreover be better understood and various important characteristics will become clear in the course of the following description of an advantageous embodiment given solely by way of example, reference being made to the accompanying drawings in which:

FIGURE 1 is a longitudinal section of a gear box of a motor vehicle according to the invention, FIGURE 2 is a section along the line II—II of FIGURE 1, and FIGURE 3 is a block diagram of the various automatic control members connected to the device shown in FIGURE 1.

The device shown in the drawings essentially comprises a hydraulic torque converter generally designated by 1 located in a housing 2, a gear box generally indicated at 3 and located in a casing 4 removably attached to the casing 2, and finally a clutch generally indicated at 5 and located in a casing 6 secured to the casing 4 of the box and provided with a cover 7 which is easily removed.

The rotation of the driving shaft 8 which is driven for example by an internal combustion engine is transmitted by means of the converter 1 and the gear box 3 to a driven shaft 9. In the case of the embodiment shown in the drawing the driven shaft 9 is intended to drive the wheels of a vehicle by means of a cone clutch (not shown), but it may of course be connected to any other member without departing from the scope of the invention.

On the driving shaft 8 is keyed a first set of blades 10 of the converter, located opposite a second set of blades 11 keyed to the output shaft 12 of the converter which is itself mounted coaxially about the shaft 8. A set of blades 13, known as reactor blades, is inserted between the blades 10 and 11 and is mounted coaxially with the shaft 12 by means of a free wheel generally referred to at 14.

A drum 15 is keyed to, and rotates with the output shaft 12 of the converter, said drum 15 supporting a free wheel 16 coaxial with the shaft 12. The gear box itself comprises two intermediate shafts 17 and 18 mounted idly, that is, for rotation with respect to one another, and being coaxial with the shaft 12. Bearings 19 and 20 ensure the centering of the shaft in the casing 3 of the box while bearings 21 and 22 allow the two shafts to rotate freely with respect to one another. The shaft 17 is keyed to, and rotates with the internal ring 16a of the free wheel 16 and is thus able to be fixed relative to the shaft 12 for rotation therewith under certain conditions as will be more fully explained hereinafter.

The shaft 18 is keyed to the output plate 23 of the clutch 5, the input plate 24 of which is keyed to a shaft 25 engaging with the driving shaft 8. In the embodiment shown in the drawings, the shaft 25 is arranged coaxially within the shaft 12 and the shaft 8 which latter two shafts are hollow, the shaft 25 having at its end external splines or grooves which co-operate with corresponding internal splines or grooves provided in the shaft 8.

The input plate 24 comprises two rings 24a and 24b which are engageable with the friction discs 26 and 27 connected to the output plate 23. The ring 24a is axially slidable towards the disc 26 under the action of levers 28 which pivot on pins 29 secured to the ring 24b. The levers 28 are actuated by means of a ball bearing 30 slidable axially on the cover 7 of the casing 6 of the clutch by means of a device which is preferably hydraulic and connected to the driving shaft 8. For example as shown in the drawings there are provided pistons 31 sliding axially in cylinders 7a provided in the cover 7, such cylinders being connected through a valve 33 to a source of fluid 32 under pressure (FIGURE 3). The valve 33 is controlled by a device 34 to the driving shaft 8 and which causes a particular signal to be produced when the characteristics of the driving shaft, viz. its speed of rotation, and the torgue transmitted, fall within a predetermined range. A device of this type is disclosed in the abovementioned French Patent 1,113,984, but it would of course be possible to use any similar device for the clutch control.

When the valve 33 is in its closed position the clutch 5 is disengaged but as soon as the speed of rotation of the driving shaft and the torque transmitted have reached high enough values the control device 34 transmits a signal which effects the opening of the valve 33 and consequently the engagement of the clutch 5.

Pinions, of which there are three in the embodiment shown in the drawings, referred to at 35, 36 and 37, are idly mounted coaxially with the shaft 17 and 18 and are in constant engagement with pinions 38, 39 and 40 on the driven shaft 9. The pinions 35 and 37 which, as will be seen hereinafter, are rotationally fixed on shafts 17 and 18 respectively when they transmit the driving torque, are each mounted directly on a cylindrical portion of the respective shaft. However the pinion 36 which is selectively drivable by one or other of the shafts 17 and 18, is mounted upon the shaft 17 by means of rings 41 and 42. The shafts 17 and 18 have on their peripheries grooved selector collars 17a and 18a in which are engaged forks 43 and 44 secured to a rod 45 which slides in the casing 3 parallel to the axis of shafts 17 and 18. The rod 45 is actuated in a manner known per se by a lever 46 mounted to pivot at 47 on the casing 4, and having an end 46a engaged for example in an appropriate seating in the fork 44. The collars 17a and 18a on the shafts 17 and 18 are mounted slidably with respect to the shafts themselves and comprise dog clutches which engage with corresponding dog clutches 35a and 36a, and dog clutches 36b and 37b of the pinions. Synchronisers of a known type are provided between the dog clutches of the collars 17a and 18a and those of the pinions.

When the lever 46, starting from the position shown in full lines in FIGURE 1, corresponding to the dead center position of the gear box, pivots in a counter-clockwise direction, the dog clutches of the collars 17a and 18a engage in the dog clutches 35a and 36b respectively thus securing the pinion 35 to the shaft 17 and the pinion 36 to the shaft 18. If on the other hand the lever 46 pivots in a clockwise direction, the pinions 36 and 37 are secured respectively to the shaft 17 and 18.

It should however be noted that the scope of the invention would not be departed from were only two positions to be provided for the shafts 17 and 18 having sliding collars 17a and 18a, one of which positions would correspond to the neutral or dead center and the other to the engagement with the dog clutches on the two pinions. In other words it would be possible only to have two pinions 35 and 36 or, on the contrary two pinions 36 and 37. It should also be noted that the pinion 36 may be replaced by two other independent pinions having a different reduction ratio. However in the case of the embodiment shown in the drawing, which is applicable to the gear boxes of vehicles, the lower reduction ratio of one of the sliding collars may be the same as the upper reduction ratio of the other sliding collar.

The operation of the device according to the invention is as follows: As has been already stated, the position shown in full lines in FIGURE 1 corresponds to the dead center point i.e. "neutral" of the gear box and the rotation of the driving shaft 8 does not cause the driven shaft 9 to rotate at all. A speed range corresponds to each end position of the lever 46 and thus to each extreme position of the sliding collars 17a and 18a. When the collars 17a and 18a are thrust towards the right from the positions shown on FIG. 1, the range of speeds is the "low range" since the reduction ratios are relatively high. However when the collars 17a and 18a are thrust towards the left from the positions shown on FIG. 1, the range of speed is the "high range."

LOW RANGE OPERATION

The clutch 5 is disengaged and the output plate 23 of the clutch is able to rotate at a different speed from that of the input plate 24. The driving shaft 8 starts at a low speed and the output blades 11 of the converter rotate at a similarly low speed which is lower than that of the blades 10. The output shaft 12 thus drives the shaft 17 by means of the free wheel 16 so that the torque of the driving shaft is transmitted to the driven shaft 9 with the maximum reduction of the converter connected to the gear train 35–38. As the speed of the driving shaft 8 increases, the synchronising of the speed of shaft 12 and with that of the shaft 8 tends to be such that the reduction ratio between the driving shaft and the driven shaft is determined solely by the gear train 35–38.

When the control device 34 detects a suitable speed of rotation and torque on the driving shaft, it transmits a signal controlling the opening of the valve 33 so that the cylinders 7a are connected to the source of fluid 32 under pressure. The pistons 31 are then thrust towards the right, as viewed on FIG. 1, and cause the clutch to engage. The driving torque of the driving shaft 8 is then transmitted to the driven shaft via the shaft 25, the clutch 5, shaft 18 and the gear train 36–39. The speed of rotation of the shaft 17 thus becomes greater than that of the output shaft 12 of the converter and the latter no longer transmits any driving torque via the free wheel 16 and is thus automatically cut out. This low range operation is preferably used for starting under a heavy load.

HIGH RANGE OPERATION

This is quite similar to that described for the low range. The driving shaft 8 first drives the driven shaft 9 at the maximum reduction ratio of the converter associated with the reduction ratio of the gears 36 to 39. When the converter operates as a coupling, that is, when the speed of shaft 12 equals that of shaft 8, the only reduction is produced by the gear train 36 to 39. As soon as the driving shaft 8 reaches suitable characteristics of rotational speed and load, the clutch 5 engages and this causes, as described above, the transmission of the motor torque by means of the shaft 25, the clutch 5 and the gear train 37 to 40.

The particular problem of changing the speed range either when the engine is stopped or in operation will now be dealt with and the means provided to make this selection of speed ranges possible will be described.

In order to allow the dog clutches to engage, it is obviously necessary that, during shifting of collars 17a and 18a from their neutral positions, no driving torque be transmitted to the driving clutch even when said dog clutches are provided with synchronisers. In the present case it is thus necessary at least under certain conditions which will be stipulated hereinafter, to immobilise the shaft 12 of the converter which even for a very reduced speed of the driving shaft 8 is caused to rotate owing to the driving torque of the converter. For this purpose, a braking device is provided with advantageously acts upon the drum 15 of the free wheel 16. This device, which is shown in greater detail in FIGURE 2, comprises two pistons 48 constituting braking elements engageable with drum 15 and which slide in cylinders 49, said cylinders being selectively connectable to a source 50 of fluid under pressure, or a discharge reservoir 53, by means of a valve 51. The valve 51 may be controlled by any suitable device actuated by the lever 46 for selection of the positions of the selector collars 17a and 18a. For this purpose an electrical switch 52 is provided, the movable member of which is connected to the lever 46 and is able to close the electrical control circuit of the valve 51 before any movement of the rod 45 which carries the forks 43 and 44. The lever 46 may for example be constituted by a flexible or articulated element in order to obtain the required result.

Although a braking device for the drum 15 of the free wheel has been described in which, upon movement of lever 46 from its neutral position, fluid under pressure acts on braking elements 48 to positively urge them to their braking positions, the invention may embody a braking device in which the braking elements thereof are normally retained in released position by the fluid pressure and the movement of lever 46 from its neutral position exhausts the fluid under pressure and permits the braking elements to engage drum 15.

In order to allow a change in speed range to be effected, it is also necessary that the collar 18a be uncoupled from the driving shaft 25, i.e. the clutch 5 be disengaged. In this connection it has already been stated that when the engine stops or when the driving shaft 8 is rotating at a low speed the control device 34 brings the valve 33 into its closed position so that the clutch 5 is then in disengaged position. However, if the change in speed range is to be effected when the driving shaft is rotating at a relatively high speed, the transmission of the torque is effected by means of the shaft 25 and the clutch 5 and it is necessary that this clutch be disengaged before movement of the rod 45 is effected. A special control device for the valve 33 is thus provided which closes the communication through said valve with the source 32 of fluid and connects the cylinders 7a of the pistons 31 with a discharge reservoir 53 before any movement of the rod 45 occurs. It is thus advantageous to connect the control circuit for the valve 33 to the electrical switch 52, the movable member of which is connected to the lever 46, said control circuit being arranged in parallel with that of the valve 51 associated with the braking device for the drum 15.

When the driving shaft 8 rotates at a low speed, for example during the slowing down operation if it is driven by an internal combustion engine, the pivoting of the lever 46 first activates the electrical circuit controlling closure of the valve 51, so that the braking device acts on drum 15. When drum 15 is immobilised, the driven shaft 9 being assumed also to be stationary, the pivoting movement of the lever 46 then causes the movement of the rod 45 in either direction.

There are two possibilities if the changing of speed rang is to be effected while the driven shaft 9 is rotating.

The first possibility is that the driving torque is transmitted by means of the free wheel 16 and the collar 17a on shaft 17. In this case it will generally be sufficient temporarily to decrease the speed of rotation of the driving shaft 8 (in particular by the driver removing his foot from the accelerator of the internal combustion engine driving the shaft 8) so that the free wheel 16 automatically disconnects the shaft 17 from the driving shaft 8. In this case it will not be absolutely necessary to brake the drum 15 of the free wheel and for this purpose means may be provided which suppress the control of the braking device when the speed of the driving shaft has reached a sufficiently high value.

The other possibility is that the driving shaft 8 rotates at a high speed and the driving torque is transmitted by means of the clutch 5. Operation of the lever 46 first causes closure of the switch 52 which controls the valve 33 thus causing said valve to close and ensuring the disengagement of the clutch 5. The pivoting of the lever 46 thereafter drives the rod 45 in one or other direction.

Of course since the device herein described and shown is particularly intended to serve for an automobile vehicle, a device is provided which allows for the control of reversing. For this purpose a pinion 54 is keyed on shaft 17 and a pinion 55 is keyed on driven shaft 9. These two pinions are connectable in a known manner kinematically by means of a selector (not shown) which is engaged with pinions 54 and 55 by means of a separate control which may be connected to the lever 46 by suitably constructing the latter.

Although the embodiment described and shown is a transmission for a front-drive vehicle, the same assembly may be applied to any other type of transmission. In particular the clutch 5 is not an obstacle to the extension of driven shaft 9 toward the left from the transmission as viewed on FIG. 1. If the diameter of clutch 5 was a hindrance, it could easily be reduced by using a multi-disc clutch of smaller diameter.

Certain other secondary advantages of the device according to the invention should be noted, in particular in the case of a break-down of certain elements.

If at full speed the automatic clutch 5 were to break down the abrupt return to a higher reduction ratio could be awkward or even dangerous. In fact this disadvantage cannot exist since the free wheel 16 immediately acts so that there is no braking reaction. If however a clutch breakdown were to take place before starting, the driver would notice this since the upper combination of each speed range could not be engaged.

It should also be noted that the supply of the hydraulic fluid to the cylinders 7a of the clutch control may be advantageously ensured by the filling pump of the converter although it may also be effected by means of a separate pump or an external feed.

Finally in the particular case of a gear box for a vehicle it should be noted that maintenance will only be required for the clutch 5 and the seals of the pistons 31. These parts are easily accessible by directly dismantling the cover 7 without it being necessary to remove any other member.

The invention is of course not limited to the embodiments herein described and shown purely by way of example but extends to all modifications thereof. Thus the converter may be of a type other than that shown and numerous other embodiments may be conceived for the various clutch controls and for the control of the braking device associated with the converter output shaft.

I claim:

1. An automatic transmission for an automotive vehicle, comprising a driving shaft adapted to be rotated by the engine of the vehicle, and a driven shaft extending parallel to said driving shaft and offset with respect to the axis of the latter for connection to driving wheels of the vehicle; a hydraulic torque converter driven by said driving shaft and having an output shaft; a gear box including first and second intermediate shafts mounted so as to be free to rotate relative to each other, first and second axially slidable collars mounted on said first and second intermediate shafts, respectively, for selective displacement to at least two positions for each of said collars, pinions on said intermediate shafts meshing with corresponding pinions secured on said driven shaft, dog clutch means connected with said pinions on the intermediate shafts and being selectively operable by said collars in each of said two positions of the latter for coupling said first and second intermediate shafts to selected ones of said pinions thereon, and displacement means engaged with said first and second collars and being actuable to simultaneously displace both of said collars to a selected one of said two positions thereof; free wheel means connecting said output shaft of the torque converter with said first intermediate shaft; braking means for arresting rotation of said output shaft; a clutch including an input plate connected to said driving shaft for rotation therewith and an output plate connected to said second intermediate shaft for rotating the latter from said driving shaft when said clutch is engaged; and means controlling the engagement of said clutch in dependence on operating parameters of said driving shaft.

2. An automatic transmission according to claim 1;

wherein each of said collars is slidable to an additional neutral position at which said dog clutch means are rendered inoperative so that said intermediate shafts can turn freely independently of said pinions thereon.

3. An automatic transmission according to claim 1; wherein said intermediate shafts are coaxial with said driving shaft.

4. An automatic transmission according to claim 1; wherein said gear box is disposed axially between said torque converter and said clutch.

5. An automatic transmission according to claim 4; and wherein said output shaft of the torque converter and said intermediate shafts are hollow and aligned axially with said driving shaft, and said input plate of the clutch is connected to said driving shaft by an extension of the latter passing through said hollow output shaft and intermediate shafts.

6. An automatic transmission according to claim 1; wherein said pinions on said intermediate shafts consist of first, second and third pinions, said first and second pinions being adapted to be selectively coupled to said first and second intermediate shafts, respectively, and said third pinion being adapted to be selectively coupled to said first or said second intermediate shaft upon displacement of said slidable collars to one or the other of said two positions thereof.

7. An automatic transmission according to claim 6; further comprising control means for said braking means to operate the latter upon actuation of said displacement means to displace said collars to a selected one of said two positions.

8. An automatic transmission according to claim 1; wherein said means controlling engagement of the clutch includes at least one cylinder, a piston slidable in said cylinder, means for effecting relative clutch engaging and disengaging movement of said input and output plates of the clutch in response to movement of said piston, means for supplying fluid under pressure to said cylinder and having a control valve interposed therein, and means to actuate said control valve so as to engage said clutch when the rotational speed and load on said driving shaft attain predetermined values.

9. An automatic transmission according to claim 8; wherein said means controlling engagement of the clutch further includes means to actuate said control valve so as to disengage said clutch upon actuation of said displacement means to displace said collars to a selected one of said two positions.

10. An automatic transmission according to claim 9; wherein said displacement means includes a movable actuating member, and said means to actuate said control valve so as to disengage said clutch includes an electric circuit having a switch interposed therein operable by movement of said actuating member; and further comprising control means for said braking means also having said switch interposed therein to operate said braking means upon said movement of said actuating member.

References Cited by the Examiner
UNITED STATES PATENTS

| 2,689,030 | 9/1954 | Wemp | 74—732 X |
| 2,888,841 | 6/1959 | Peras | 74—732 X |
| 2,926,551 | 3/1960 | Howard | 74—732 X |

FOREIGN PATENTS 814,999  6/1959  Great Britain.

DAVID J. WILLIAMOWSKY, *Primary Examiner.*

FRED C. MATTERN, *Examiner.*

L. H. GERIN, *Assistant Examiner.*